(12) United States Patent
Kato et al.

(10) Patent No.: US 6,710,013 B1
(45) Date of Patent: Mar. 23, 2004

(54) EXHAUST EMISSION CONTROL CATALYST STRUCTURE

(75) Inventors: Yasuyoshi Kato, Kure (JP); Kouichi Yokoyama, Kure (JP); Eiji Miyamoto, Kure (JP); Masatoshi Fujisawa, Kure (JP)

(73) Assignee: Babcock-Hitachi Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/763,779

(22) PCT Filed: Sep. 9, 1999

(86) PCT No.: PCT/JP99/04909

§ 371 (c)(1),
(2), (4) Date: Apr. 20, 2001

(87) PCT Pub. No.: WO00/13775

PCT Pub. Date: Mar. 16, 2000

(30) Foreign Application Priority Data

Sep. 9, 1998 (JP) .......................... 10-255447
Jan. 22, 1999 (JP) .......................... 10-014617

(51) Int. Cl.$^7$ ................................ B01J 23/00
(52) U.S. Cl. .............. 502/439; 502/350; 502/527.18; 502/527.22; 502/527.24
(58) Field of Search ............... 502/309, 312, 502/321, 350, 353, 439, 527.14, 527.17, 527.18, 527.19, 527.2, 527.21, 527.22, 527.24

(56) References Cited

U.S. PATENT DOCUMENTS

| | | | | | |
|---|---|---|---|---|---|
| 4,416,800 A | * | 11/1983 | Abe et al. | ............. | 502/159 |
| 5,281,128 A | * | 1/1994 | Dalla Betta et al. | ............. | 431/7 |
| 5,439,868 A | * | 8/1995 | Onitsuka et al. | ............. | 502/415 |
| 5,512,251 A | * | 4/1996 | Brunson et al. | ............. | 422/174 |

FOREIGN PATENT DOCUMENTS

| | | |
|---|---|---|
| JP | 2-307512 | 12/1990 |
| JP | 8-29088 | 2/1996 |

\* cited by examiner

*Primary Examiner*—Stanley S. Silverman
*Assistant Examiner*—Edward M. Johnson
(74) *Attorney, Agent, or Firm*—Fay, Sharpe, Fagan, Minnich & McKee, LLP (57) ABSTRACT

Provided is a catalyst structure used for purifying an exhaust gas; to be disposed in an exhaust gas flow passage; preferable for obtaining a highly efficient and compact exhaust gas purifying apparatus; and produced by alternately stacking platelike catalysts 1, and gas dispersing members composed of netlike products 7 having many holes passing from the front surface to the back surface thereof, or linear, belt-shaped, or rodlike materials of a metal, ceramic, or glass to disturb the flow of an exhaust gas in a flow passage of the gas thereby to promote contact of the gas to be treated with the catalyst.

18 Claims, 2 Drawing Sheets

Fig. 6

EXHAUST EMISSION CONTROL CATALYST STRUCTURE

TECHNICAL FIELD

The present invention relates to a catalyst structure for purifying an exhaust gas. Specifically, the present invention relates to a catalyst structure and an apparatus for purifying an exhaust gas comprising platelike catalysts used therein for reducing nitrogen oxides (hereinafter referred to as NOx) in an exhaust gas efficiently with ammonia ($NH_3$).

BACKGROUND ART

Nitrogen oxides (NOx) in exhaust gases discharged from power plants, various plants, automobiles, and others are causative agents for photochemical smog and acid rain. As a method for removing NOx, an exhaust gas denitration method by a selective catalytic reduction using ammonia ($NH_3$) or the like as reducing agent has widely been employed with thermal power plants being its center. As denitration catalyst used for such exhaust gas denitration method, a titanium oxide type catalyst containing, for example, titanium dioxide ($TiO_2$) as a main component, and vanadium (V), molybdenum (Mo), or tungsten (W) as active component has been used. Particularly, a catalyst containing vanadium as one of the active components has become a mainstream of current denitration catalysts since the catalyst is not only high in activity, but also small in deterioration due to impurities contained in an exhaust gas and usable at temperatures from a low temperature (Laid-open Japanese Patent Publication No. Sho 50-128681 and others).

As the shape of the catalysts used for such exhaust gas denitration method, honeycomb-like or platelike shape has usually been adopted and various manufacturing methods have been proposed. Among them, catalyst structures obtained by stacking a) many netlike products which are prepared by processing metallic thin plates into metal laths and then spraying molten aluminum thereon or b) many platelike catalysts which are prepared by using woven fabrics or nonwoven fabrics of ceramic fibers as substrate (base plates), applying the catalyst component described above thereon, and then pressing the substrates into elements of a waveform (Laid-open Japanese Patent Publication Nos. Sho 54-79188 and Sho 59-73053 and others) have such excellent characteristics that the draft loss is small and the gas flow passages are hardly clogged with a smoke dust or coal combustion ashes, and thus the catalyst structures are currently used in many denitration apparatuses for exhaust gases from boilers of thermal power plants.

Then, in order to increase the efficiency of exhaust gas denitration apparatuses, attempts to reduce the raw material cost and draft loss by reducing the thickness of catalyst plates have been conducted in many fields in recent years. Also, even in the field wherein exhaust gases discharged from coal burning boilers were objects to be treated and catalysts having a large catalyst pitch (distance between catalysts) were used at a low gas flow speed heretofore, demands for compact denitration apparatuses in which gas flow speed is increased and the catalyst pitch is reduced at the same time to increase denitration efficiency have been increased.

DISCLOSURE OF THE INVENTION (Although only catalyst structures comprising a plurality of platelike catalysts and gas dispersing members are described hereinafter, it is contemplated that the present invention includes catalyst structures comprising a platelike catalyst and gas dispersing member.)

An object of the present invention is to provide a highly efficient and compact catalyst structure for purifying an exhaust gas and to provide an apparatus for purifying an exhaust gas.

Problems in the prior art described above are solved by the present invention which is summarized as follows:

(1) A catalyst structure, to be disposed in a frame fitting in an exhaust gas flow passage, for purifying an exhaust gas comprising
   platelike catalysts having many protruded portions, or mountain portions and valley portions, formed by bending flat platelike catalysts alternately to the reverse direction at a prescribed interval, and
   gas dispersing members composed of metallic, ceramic, or glass netlike products having many holes passing from the front surface to the back surface thereof stacked alternately.

(2) The catalyst structure for purifying an exhaust gas recited in paragraph (1) above wherein the platelike catalysts are products produced by applying a catalyst component containing titanium oxide as a main component, and an oxide of vanadium, molybdenum, and/or tungsten added as active component, to meshes of metal laths or glass fiber woven fabrics reinforced with an inorganic bonding agent so that the catalyst component is embedded in the meshes.

(3) The catalyst structure for purifying an exhaust gas recited in paragraph (1) or (2) above wherein the netlike products are metal laths.

(4) The catalyst structure for purifying an exhaust gas recited in paragraph (1) or (2) above wherein the netlike products are glass fiber woven fabrics reinforced by impregnating the fabrics with an inorganic bonding agent.

(5) The catalyst structure for purifying an exhaust gas recited in any one of paragraphs (1) to (4) above wherein a catalyst component is deposited on the surface of the netlike products.

(6) The catalyst structure for purifying an exhaust gas recited in paragraph (5) above wherein the catalyst component is an oxide or oxides of one or more metals selected from the group consisting of titanium, vanadium, molybdenum, and tungsten.

(7) The catalyst structure for purifying an exhaust gas recited in any one of paragraphs (1) to (6) above wherein the protruded portions or mountain portions of the platelike catalysts are formed with their lengthwise direction being inclined relative to one side of the platelike catalysts by a prescribed angle, and a plurality of the platelike catalysts are stacked with the netlike product being interposed therebetween and with the left and right sides of the platelike catalysts being interchanged alternately.

(8) An apparatus for purifying an exhaust gas having a catalyst structure recited in any one of paragraphs (1) to (7) above and disposed in an exhaust gas flow passage.

(9) A catalyst structure to be disposed in a frame fitting in an exhaust gas flow passage for purifying an exhaust gas, comprising
   platelike catalysts having many pairs of protruded portions, or mountain portions and valley portions at a prescribed interval formed by bending flat platelike catalysts alternately to reverse direction, and
   gas dispersing members prepared by arranging linear, belt-shaped, or rodlike materials of metal, ceramic, or glass in parallel at a prescribed interval stacked alternately.

(10) The catalyst structure for purifying an exhaust gas recited in paragraph (9) above wherein the catalyst plates are products produced by applying a catalyst component containing titanium oxide as a main component, and an oxide of vanadium, molybdenum, and/or tungsten added as active component, to meshes of metal laths or glass fiber woven fabrics reinforced with an inorganic bonding agent so that the catalyst component is embedded in the meshes.

(11) The catalyst structure recited in paragraph (9) above wherein the gas dispersing members are structures prepared by connecting a part or all of the linear, belt-shaped, or rodlike materials.

(12) The catalyst structure recited in any one of paragraphs (9) to (11) above wherein the gas dispersing member is disposed on a line connecting contact points of a protruded portion of one of adjacent catalyst plates with a flat plate portion of the other catalyst plate to be stacked.

(13) The catalyst structure recited in any one of paragraphs (9) to (12) above wherein the gas dispersing members are products reinforced by impregnating the members with an inorganic bonding agent.

(14) The catalyst structure recited in any one of paragraphs (9) to (13) above wherein a catalyst component is deposited on the surface of the gas dispersing members.

(15) The catalyst structure recited in paragraph (14) above wherein the catalyst component to be deposited on the surface of the gas dispersing members is an oxide or oxides of one or more metals selected from the group consisting of titanium, vanadium, molybdenum, and tungsten.

(16) The catalyst structure recited in any one of paragraphs (9) to (15) above wherein the protruded portions or mountain portions of the platelike catalysts are formed with their lengthwise direction being inclined relative to one side of the platelike catalysts by a prescribed angle, and a plurality of the platelike catalysts are stacked with the gas dispersing member being interposed therebetween and with their left and right sides of the platelike catalysts being interchanged alternately.

(17) An apparatus for purifying an exhaust gas having a catalyst structure recited in any one of paragraphs (9) to (16) above and disposed in an exhaust gas flow passage.

BRIEF DESCRIPTION OF THE DRAWINGS

In the Figures, 1 is a platelike catalyst, 2: a flat plate portion, 3: a protruded portion, 4: a mountain portion, 5: a valley portion, 6: flow direction of an exhaust gas, 7: a netlike product (gas dispersing member), 8: a catalyst structure, and 10: a gas dispersing member (rodlike material).

BEST MODE FOR CARRYING OUT THE INVENTION

Now, the present invention will be described in more detail with reference to drawings.

Catalyst structure of the present invention preferably comprises many platelike catalysts having many protruded portions, or mountain portions and valley portions, formed by bending flat platelike catalysts alternately to the reverse direction at a prescribed interval, and many gas dispersing members composed of netlike products, or linear, belt-shaped, or rodlike materials alternately stacked.

Figure 1:
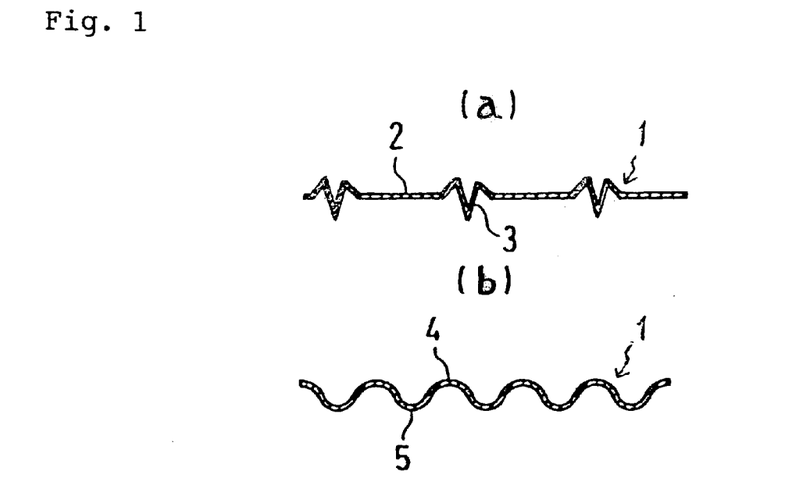
FIG. 1 shows cross-sectional views of platelike catalysts used in the present invention.

FIG. 1 shows cross-sectional views of typical platelike catalysts used in the present invention. In FIG. 1, (a) shows the cross-sectional view of platelike catalyst 1 having flat plate portion 2 and protruded portion 3 alternately formed therein, and (b) shows the cross-sectional view of another platelike catalyst 1 of a waveform (corrugated sheetlike) having mountain portion 4 and valley portion 5 alternately formed therein. In FIG. 1 (a), whereas protruded portion 3 has a W-shaped cross section, it may be a Z-shaped cross section. In the case of a corrugated sheetlike catalyst, the catalyst may have a V-shaped protruded portion in addition to the protruded portion (mountain portion) having an R-like cross section (cross section having a radius of curvature) shown in FIG. 1 (b).

Figure 2:
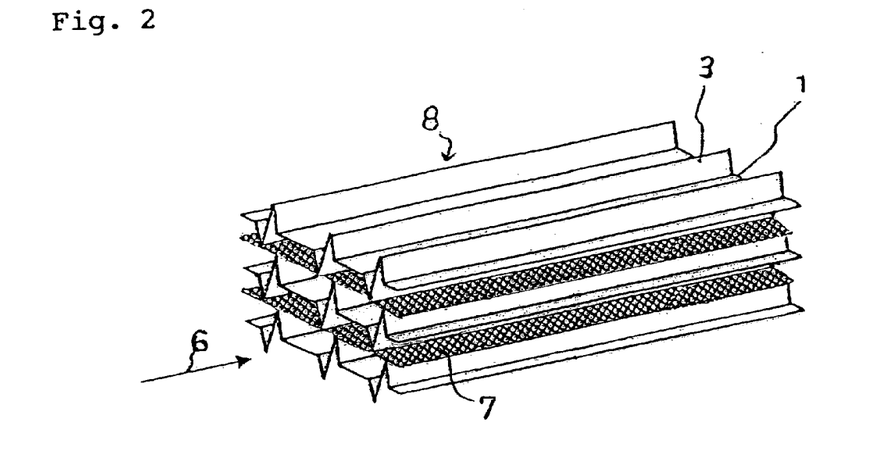
FIG. 2 shows a perspective view of a catalyst structure of the present invention used for purifying an exhaust gas and comprising netlike products as gas dispersing member.

FIG. 2 shows a perspective view of catalyst structure 8 of the present invention formed by alternately stacking platelike catalyst 1 having protruded portion 3 of a Z-shaped cross section and metallic netlike product 7. This catalyst structure 8 is received in an appropriate frame and disposed, for example, in a flow passage of an exhaust gas of a denitration apparatus so that the lengthwise direction of the protruded portion 3 becomes parallel to the flow direction 6 of an exhaust gas.

In the present invention, the platelike catalysts are produced by applying a catalyst paste containing titanium oxide as a main component and containing an oxide or oxides of one or more metals selected from the group consisting of vanadium (V), molybdenum (Mo), and tungsten (W) to catalyst base materials such as wire-nettings so that the catalyst paste is embedded in the meshes of the catalyst base materials, pressing the materials, forming them into the materials of a prescribed shape, and then drying the formed materials. To the catalyst paste, a well known measure such as an addition of inorganic fibers and a bonding agent can be applied at the same time.

As the catalyst base materials, for example, metallic substrates such as wire-nettings and metal laths having through-holes, woven cloths prepared by weaving twisted yarns of inorganic fibers such as ceramic or glass fibers into netlike products, or a woven cloths prepared by impregnating or coating an inorganic bonding agent to the woven cloths described above to reinforce and impart a rigidity thereto can be used. With respect to the size of the meshes of the base materials, a larger size as much as possible, within the range wherein the strength of a catalyst or catalyst structure permits, tends to yield a better result. As the catalyst base materials, materials prepared by applying (depositing or coating) a catalyst component on the surface of the metallic or inorganic fiber netlike products so that the catalyst component does not block the through-holes (meshes) of the netlike products can also be used. The term "metal laths" used in this specification means metallic plates prepared by forming a prescribed length of many cuts in metallic plates at a prescribed interval in a zigzag pattern, and then expanding the metallic plates in the direction perpendicular to that of the cuts to make the cuts deform thereby to form a large number of perforations passing through from the front surface to the back surface thereof.

As the method for preparing platelike catalysts having protruded portions, or mountain portions and valley portions, for example, a method wherein flat platelike catalysts prepared by applying a catalyst component on metallic substrates, ceramic substrates, or the likes are formed into a prescribed shape through plastic deformation with a machining apparatus such as a roller press and plane press, and a method wherein the flat platelike catalysts described above are deformed and dried at the same time by using a roller press or plane press additionally having a heating means can be used. While the dimensions of platelike catalysts at forming are not specifically limited, for example, in the case of a denitration catalyst having W-shaped cross section, its thickness is 0.5 to 2 mm, length of flat plate portions is 10 to 100 mm, and height of protruded portions is 1 to 10 mm.

Method for stacking platelike catalyst 1 and netlike product 7 is not specifically limited, and a method wherein the platelike catalysts in which lengthwise direction of protruded portions 3 is inclined relative to one side of the platelike catalysts by a prescribed angle, for example, 30° are stacked with the left and right sides of the catalysts being interchanged alternately may be used, in addition to a method wherein platelike catalysts 1 having the same shape and formed so that the lengthwise direction of protruded portions 3 is parallel to one side of the platelike catalysts 1 are stacked alternately with netlike products 7.

When many platelike catalysts are stacked through netlike products, the case wherein platelike catalysts are directly stacked each other ceases to exist, it is not necessary to stack the catalysts with their mountain portions being displaced, and thus assembling of a catalyst structure becomes easy even when platelike catalysts of the same shape are used.

Besides, when a catalyst structure is used in the state of being incorporated into an apparatus for purifying an exhaust gas, the efficiency of the catalyst reaction is increased since a gas agitation effect by netlike products is developed. In a catalyst structure in which gas flow passages are formed parallel to the gas flow, the gas flow which flows in the flow passage generally forms a laminar flow, the speed at which an objective component diffuses to the catalyst surface at the center portion of the flow passage becomes remarkably slow. In the present invention, however, the speed at which an objective component diffuses to the catalyst surface is remarkably increased because netlike products are disposed so that the products block the center portion of the gas flow passage where the diffusion speed becomes slow, and thus the gas flow at the center portion of the gas flow passage is disturbed by the turbulence or eddy formed by the irregularity on the surface of netlike products or a netlike products themselves. Thus, according to the present invention, extremely high catalyst performances can be obtained even at the same amount of catalyst.

In the present invention, when the shape of platelike catalysts was made to be different between the catalyst disposed on and below the netlike products, or when only one of the catalysts having the same shape is reversed or left and right sides of only one of the catalysts having the same shape are alternately interchanged, a gas agitation effect is further increased since the direction of a gas flow flowing in a gas flow passage becomes different between the front side and back side of the netlike products, and thus higher catalyst performances can be obtained.

Figure 4:
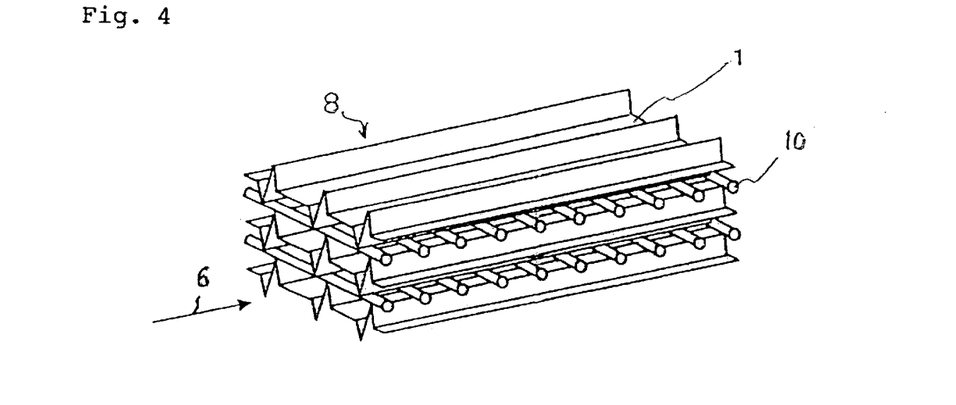
FIG. 4 shows a perspective view of a catalyst structure of the present invention used for purifying an exhaust gas and comprising rodlike materials as gas dispersing member.

FIG. 4 shows catalyst structure 8 wherein a plurality of metallic rodlike gas dispersing members 10 are disposed parallel at a prescribed interval to the direction perpendicular to the flow direction 6 of an exhaust gas, instead of netlike products 7 used in the catalyst structure shown in FIG. 2. As gas dispersing members 10, linear or belt-shaped ones may be used in addition to rodlike ones.

Figure 6:
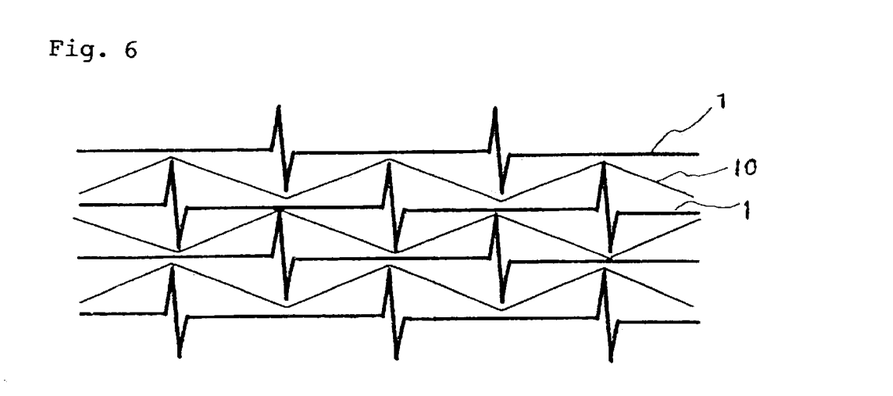
FIG. 6 is an illustration showing an example of using gas dispersing members of the present invention.

In the netlike products used in the catalyst structure shown in FIG. 2, it was impossible to adjust pressure loss depending on the conditions of an exhaust gas, and thus the tolerance was small at the time of designing apparatus. In the catalyst structure shown in FIG. 4, however, design range (flexibility) of the apparatus can be extended. For example, increase of pressure loss can be repressed by increasing the distance for disposing gas dispersing members (rods) even when the gas dispersing members are placed between the catalyst plates disposed at a small pitch, because the pressure loss can unrestrictedly be controlled by disposing rodlike gas dispersing members 10 between platelike catalysts 1 and changing the distance between the members (rods) to be disposed. Besides, production cost of the apparatus can be depressed since it is sufficient to use fewest possible gas dispersing members (rods) for disturbing the gas flow. Further, it is possible to prevent the reduction in gas dispersing effect even when the catalyst structure is used for an exhaust gas containing a large amount of dust because when the interval with which gas dispersing members (rods) are disposed is sufficiently increased, the gas which flows around the gas dispersing members removes a deposited dust even when the dust was deposited on the gas dispersing members, and thus an amount more than a certain one of dust does not remain on the gas dispersing members. Still further, when a heavy metal is used as base material of platelike catalysts, it is preferable to use gas dispersing members having a sufficiently high strength, and the strength of the catalyst structure can be increased by placing gas dispersing members 10 on the lines connecting contact points of two platelike catalysts stacked as shown in FIG. 6.

Figure 5:
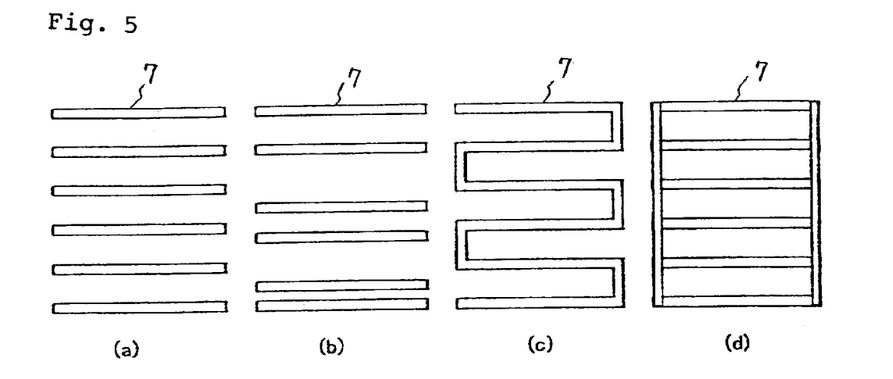
FIG. 5 shows the plane view of examples (a) to (d) of gas dispersing members used in the present invention.

FIGS. 5 (a) to (d) show plane views showing various embodiments of gas dispersing members 10 used in the present invention.

Gas dispersing members may be disposed at an equal interval or different interval as shown in FIGS. 5 (a) and (b). Also, gas dispersing members may have an integrated structure prepared by bending long rodlike members as shown in FIG. (c) and (d), or may have a structure in which a part or all parts of the gas dispersing members are connected. Shape or material of gas dispersing members may be all the same or different in a catalyst structure.

Cross-sectional shape of gas dispersing member 10 may be a circle, ellipse, hexagon, or hollow, but the shape is not specifically limited in the present invention. Gas dispersing members 10 are disposed in the direction perpendicular to the gas flow direction in principle, but it may be disposed with their direction being slightly changed between above and below the platelike catalyst.

Material of gas dispersing members may be metal, ceramic, or glass, but the material is not particularly limited in the present invention.

The larger the size of gas dispersing members, the higher the strength of the catalyst structures, but the size is not specifically limited in the present invention. Length of gas dispersing members is not specifically limited so far as the members have a length sufficient to across a gas flow passage in a catalyst in its width direction.

Gas dispersing members may be coated with a catalyst component, inorganic bonding agent and/or reinforcing liquid.

The present invention will be described in more detail with reference to Examples. However, it should be understood that the scope of the present invention is by no means restricted by such specific Examples.

EXAMPLE 1

Catalyst substrates were obtained by impregnating netlike products prepared by plain weaving twisted yarns each of 1400 E glass fibers having a fiber diameter of 9 $\mu$m at a density of 10 yarns/25.4 mm with a slurry containing 40% of titania, 20% of silica sol, and 1% of polyvinyl alcohol, and then drying the impregnated products at 150° C. to impart a rigidity.

On the other hand, 0.25 kg of ammonium paramolybdate $((NH_4)_6 \cdot Mo_7O_{24} \cdot 4H_2O)$, 0.23 kg of ammonium metavanadate $(NH_4VO_3)$, and 0.3 kg of oxalic acid were added to 1.2 kg of titanium oxide having a specific surface area of about 270 $m^2/g$ in a separate step, a silica sol of 20% by weight was further added thereto in an amount of 8% by weight in terms of $SiO_2$, and then the mixture was kneaded while adding water thereto to form a paste. To the paste was added 15% by weight of kaolin type inorganic fibers (trade name: Kaowool) and further kneaded to obtain a paste having a water content of 30.5%.

Figure 3:
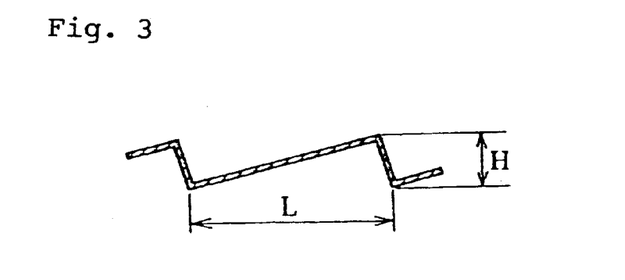
FIG. 3 shows a cross-sectional view indicating the dimensions of a platelike catalyst used in an Example of the present invention.

After the paste described above was placed between two sheets of the catalyst substrates of 500 mm wide prepared by the previous procedures and the paste was applied on the surface of the netlike products (catalyst substrates) and in the meshes thereof by pressing them with a pair of press rolls, the substrates were cut to a length of 480 mm to obtain platelike catalysts of 0.7 mm thick. Subsequently, each of the catalysts thus obtained was inserted in a heating mold and pressed while being heated to dry thereby to obtain a platelike catalyst (hereinafter referred to as catalyst element) having a length (L) of flat plate portions of 44 mm and many protruded portions having a height (H) of 1.8 mm as shown in FIG. 3. Many sheets of the catalyst elements thus obtained were stacked with netlike products, which were prepared by cutting such E glass fiber woven fabrics having a rigidity as described above and used as catalyst substrate into a square of 480 mm, being interposed, and the stack of the catalysts was assembled in a metallic frame and calcined while being ventilated at 500° C. for 2 hours to obtain a catalyst structure.

EXAMPLE 2

Ammonium metatungstate $((NH_4)_6 \cdot H_2W_{12}O_{40} \cdot 23H_2O)$ in an amount of 3.8 kg and 1.28 kg of ammonium metavanadate $(NH_4VO_3)$ were added to 67 kg of a slurry of metatitanic acid ($TiO_2$ content: 30% by weight, $SO_4$ content: 8% by weight) and kneaded by using a heating kneader while evaporating water to obtain a paste containing about 36% of water. Subsequently, this paste was extruded into a rodlike material of 3$\phi$, pelletized, dried in a fluidized drier, and then calcined in an atmosphere at 250° C. for 2 hours. The pellets thus obtained were ground with a hammer mill into powders having an average particle diameter of 5 $\mu$m. The powders thus obtained in an amount of 20 kg, 3 kg of $Al_2O_3 \cdot SiO_2$ type inorganic fibers, and 10 kg of water were kneaded by using a kneader for 1 hour to make them paste-like. This catalyst paste was applied on the surface and in the meshes of SUS304 metal lath substrates having a width of 490 mm and a thickness of 0.2 mm by using a roller press to obtain catalyst elements having a thickness of about 0.9 mm. These catalyst elements were formed by using a press mold so that the length (L) of flat plate portions became 60 mm and height (H) of level-changing portions became 5 mm to obtain catalyst elements.

Many sheets of the catalyst elements thus obtained were stacked with netlike products, which were prepared by cutting such SUS304 metal laths as described above and used as catalyst substrate into a square of 480 mm, being interposed to form a stack of catalysts, and the catalyst stack was assembled in a metallic frame and calcined while being ventilated at 500° C. for 2 hours to obtain a catalyst structure of Example 2.

EXAMPLES 3 AND 4

Ammonium paramolybdate $((NH_4)_6 \cdot Mo_7O_{24} \cdot 4H_2O)$ in an amount of 0.25 kg, 0.23 kg of ammonium metavanadate $(NH_4VO_3)$, 0.3 kg of oxalic acid, and water were added to 1.2 kg of titanium oxide having a specific surface area of about 270 $m^2/g$, and the mixture was kneaded while adding water to form a paste. Subsequently, this paste was extruded and formed with a pelletizer into column-like products of 3$\phi$. The formed products were dried, calcined at 550° C. for 2 hours, ground with a pulvelizer to obtain powders in which more than 60% of particles had a particle size of less than 1 $\mu$m. Water was added to the powders thus obtained to prepare a catalyst slurry having a solid content of 40%. After the netlike products used in Examples 1 and 2 were impregnated with the catalyst slurry and then pulled up from the slurry, an excess amount of the slurry was removed by an air blow and the products were dried to obtain netlike products on the surface of which a catalyst component was coated, respectively. Catalyst structures of Examples 3 and 4 were obtained by repeating the same methods as in Examples 1 and 2 with the exception that the netlike products described above were used in place of the netlike products used in Examples 1 and 2, respectively.

COMPARATIVE EXAMPLES 1 AND 2

Catalyst structures of Comparative Examples 1 and 2 were prepared in the same manners as in Examples 1 and 2 with the exception that the catalyst elements which were formed such that the position of mountain portions (level-changing portions) at the time of forming was shifted by 5 mm and 8 mm, respectively, in turn were directly stacked without interposing of netlike products so that the order of the shift described above was not disturbed.

EXAMPLE 5

Catalyst structure of Example 5 was prepared in the same manner as in Example 1 by stacking catalyst elements while interposing the same netlike products as used in Example 1 with the exception that "protruded portion inclined catalyst elements" in which lengthwise direction of the protruded portions was inclined by 30° relative to one side of catalyst elements were used and the elements were stacked with their left and right sides being alternately reversed.

EXAMPLE 6

Catalyst structure of Example 6 was obtained by using many "protruded portion inclined catalyst elements" as used in Example 5 and many catalyst elements as used in Example 1, and alternately stacking them while interposing the same netlike products as those in Example 1 therebetween.

As to the catalysts of Examples 1 to 6 and Comparative Example the 1 to 2, disturbance in the shape of flow passage at both ends in catalyst structures was examined and a denitration property were determined under the conditions shown in Table 1. The results thus obtained are collectively shown in Table 2.

TABLE 1

| | |
|---|---|
| NOx concentration (ppm) | 80 |
| NH$_3$/NOx (—) | 1.2 |
| Temperature (° C.) | 350 |
| SV (h$^{-1}$) | 45,000 |

TABLE 2

| Catalyst | Catalyst components | Netlike products | Disturbance[1] | Denitration ratio (%) |
|---|---|---|---|---|
| Example 1 | Ti/Mo/V | R. G fiber woven fabrics[2] | None | 79.6 |
| Example 2 | Ti/W/V | Metal laths | None | 65.2 |
| Example 3 | Ti/Mo/V | Cat. coat R. G fiber woven fabrics[3] | None | 90.1 |
| Example 4 | Ti/W/V | Cat. coat metal laths[4] | None | 84.1 |
| Example 5 | Ti/Mo/V | R. G fiber woven fabrics[2] | None | 84.9 |
| Example 6 | Ti/Mo/V | R. G fiber woven fabrics[2] | None | 81.5 |
| Comp. Example 1 | Ti/Mo/V | None | Large | 63 |
| Comp. Example 2 | Ti/W/V | None | Slightly large | 50.5 |

Note
[1]Disturbance in the shape of flow passages at both ends
[2]Reinforced woven fabrics of glass fibers
[3]Reinforced woven fabrics of glass fibers coated with a catalyst component
[4]Metal laths coated with a catalyst component In Table 2, when Examples 1 and 2 are compared with Comparative Examples 1 and 2, whereas disturbance in the interval between catalyst elements at both ends of the catalyst structures was large in the Comparative Examples, uniform intervals were maintained in the Examples. Besides, it can be found that denitration ratio was increased with the catalyst structures of the Examples due to a gas agitating effect by netlike products interposed between catalyst elements compared with Comparative Examples wherein netlike products were not used. From these facts, it can be understood that the catalyst structures of the present invention have a high strength and uniform flow passages, and have an increased denitration property compared with Comparative Examples.

Next, when Examples 1 and 2 are compared with Examples 3 and 4, catalyst performances in Examples 3 and 4 were more improved compared with Examples 1 and 2, because in Examples 3 and 4, netlike products coated with a catalyst component were used, and thus the catalysts came to be placed in gas flow passages in which the gas agitation effect is largest. Also, when the denitration property of catalyst structures of Examples 5 and 6 are compared with that in Example 1, it can be understood that the denitration property is increased by using catalyst elements in which lengthwise direction of protruded portions are inclined by a prescribed angle.

With the catalyst structures of the Examples described above, crush or disturbance of gas flow passages hardly occurs by using such a simple method that platelike catalysts having protruded portions, or mountain portions and valley portions are stacked through flat platelike netlike products; structures of a high strength can be obtained; and further, catalyst performances are considerably increased.

EXAMPLE 7

Ammonium paramolybdate ((NH$_4$)$_6$·Mo$_7$O$_{24}$·4H$_2$O) in an amount of 0.25 kg, 0.23 kg of ammonium metavanadate (NH$_4$VO$_3$), and 0.3 kg of oxalic acid were added to 1.2 kg of titanium oxide having a specific surface area of 270 m$^2$/g, a silica sol of 20% by weight was further added thereto in an amount of 8% by weight in terms of SiO$_2$, and then the mixture was kneaded while adding water to form a paste. To the paste was added 15% by weight of kaolin type inorganic fibers (trade name: Kaowool) and further kneaded to obtain a paste having a water content of 30.5%.

After the paste described above was placed between two sheets of the catalyst substrates of 500 mm wide prepared by the previous procedures and the paste was applied on the surface and in the meshes of the netlike products by pressing them with a pair of press rolls, the substrates were cut to a length of 480 mm to obtain platelike catalysts of 0.7 mm thick. Subsequently, each of the catalyst elements thus obtained was inserted in a heating mold and pressed while being heated to dry thereby to obtain platelike catalysts having the same shape of cross section as in Example 1.

On the other hand, a stainless wire of 1.2 mm diameter was straightened and then cut each into 478 mm to obtain about 2000 pieces of wires. Also, about 200 pieces of the "Kaowool" cut into about 5 mm square and 480 mm long were prepared.

The catalyst plates, wires, and "Kaowool" obtained by the procedures described above were used. That is, both ends of the wires placed in parallel with the space of each 10 mm were held by "Kaowool" from above and below to obtain rodlike members, and the rodlike members and catalyst plates were alternately stacked and then assembled in a metal frame. At this time, wires were disposed so that their direction became perpendicular to the gas flow direction. The catalyst plates were calcined while being ventilated at 500° C. for 2 hours to obtain a catalyst structure as shown in FIG. 4.

REFERENTIAL EXAMPLE 1

Woven fabrics prepared by plain weaving twisted yarns each of 1400 E glass fibers having a fiber diameter of 9 μm at a density of 10 yarns/inch were impregnated with a slurry containing 40% of titania, 20% of silica sol, and 1% of polyvinyl alcohol, dried at 150° C. to impart a rigidity, and cut into 480 mm square to obtain woven fabrics having a thickness of 1.2 mm. These woven fabrics, instead of rodlike members comprising wires and "Kaowool" used in Example 7, and the catalyst plates as used in Example 7 were stacked alternately, assembled in a metal frame, and then calcined while being ventilated at 500° C. for 2 hours to obtain a catalyst structure.

EXAMPLE 8

After powders of titanium oxide (TiO$_2$), ammonium metatungstate ((NH$_4$)$_6$·H$_2$W$_{12}$O$_{40}$·23H$_2$O), ammonium metavanadate (NH$_4$VO$_3$) liquid were weighed so that molar ratio of Ti/W/V became 89/5/6, water in an amount of 30% by weight based on the titanium oxide mentioned above was added thereto, the mixture was kneaded in a kneader for 30 minutes, "Kaowool" in an amount of 25% by weight based on the titanium oxide as starting material was added thereto, and further the mixture was kneaded for 30 minutes to obtain a paste. This paste was applied on metal lath plates of 500 mm wide and 0.8 mm thick to obtain flat platelike catalysts. The catalysts were press formed and cut into 480 mm square to obtain catalyst plates having a cross section as shown in FIG. 1 (a).

On the other hand, a brass wire of 0.7 mm diameter was cut each into 550 mm. Some of these wires were placed on one of the catalyst plates with the distance of each 20 mm, and another catalyst plate was further stacked thereon to make it in the shape as shown in FIG. 6. A formed member prepared by further stacking catalyst plates and wires in the same manner as described above was assembled in a metal frame. At this time, wires were disposed so that their direction became perpendicular to the gas flow direction. The catalysts were calcined while being ventilated at 500° C. for 2 hours to obtain a catalyst structure.

EXAMPLE 9

Ammonium paramolybdate ($(NH_4)_6 \cdot Mo_7O_{24} \cdot 4H_2O$) in an amount of 0.25 kg, 0.23 kg of ammonium metavanadate ($NH_4VO_3$), 0.3 kg of oxalic acid, and water were added to 1.2 kg of titanium oxide having a specific surface area of 270 $m^2/g$ and kneaded to form a paste. The paste was extruded and formed with a pelletizer into columns of $3\phi$. The formed products (columns) were dried, calcined at 550° C. for 2 hours, and ground with a pulverizer to obtain powders in which more than 60% of particles had a particle size of less than 1 $\mu m$. Further, water was added to the powders thus obtained to prepare a catalyst slurry having a solid content of 40%.

The wires as used in Example 7 were impregnated with the catalyst slurry obtained by the procedures described above, pulled up, and then dried to obtain wires on which the catalyst component was coated.

Catalyst structure as shown in FIG. 4 was obtained in the same manner sa in Example 7 with the exception that the wires described above were used in place of the wires used in Example 7.

EXAMPLES 10 AND 11

Catalyst structures were prepared in the same manner as in Example 7 with the exception that the intervals with which the wires as used in Example 7 were placed was changed to 40 mm and 80 mm, respectively.

With Example 7 and Referential Example 1, number of catalyst plates used was compared and the result is shown in Table 3.

TABLE 3

|  | Number of Catalyst plates |
|---|---|
| Example 7 | 87 |
| Referential Example 1 | 103 |

In the examples shown in Table 3, both of the wires and woven fabrics used between the catalyst plates have a thickness of 1.2 mm and it can be understood that Example 7 is smaller in the number of catalyst plates but higher in strength than Referential Example 1.

With the catalysts in Examples 7, 9, 10, and 11, and Referential Example 1, denitration properties and pressure loss were determined under the conditions shown in Table 4. The results thus obtained are collectively shown in Table 5.

TABLE 4

| NOx concentration (ppm) | 80 |
|---|---|
| $NH_3/NOx$ (-1) | 1.2 |
| Concentration (° C.) | 350 |
| SV ($h^{-1}$) | 45,000 |

TABLE 5

| | | | Test results | |
|---|---|---|---|---|
| Type of catalyst structure | Catalyst coating on wires | Distance for disposing wires (mm) | Area based overall reaction rate constant (m/h) | Pressure loss per length (mmAq/m) |
| Example 7 | None | 10 | 266.4 | 156.7 |
| Referential Example 1 | — | — | 252.7 | 125.6 |
| Example 9 | Applied | 10 | 348.5 | 159.2 |
| Example 10 | None | 40 | 261.5 | 75.7 |
| Example 11 | None | 80 | 222.2 | 56.7 |

In Table 5, when the test results of Example 7, Referential Example 1, and Example 10 are compared, it can be understood that the pressure loss in Example 7 wherein the distance for disposing wires (wire disposing interval) was 10 mm is larger than Referential Example 1 wherein netlike products were used, despite the fact that the area based overall reaction rate constant was about the same, but in Example 10 wherein the wire disposing interval was arranged to 40 mm, pressure loss can be reduced to lower than in Referential Example 1. However, from the comparison of the results in these Examples with those in Example 11, it can be understood that there is a limit in the wire disposing interval for maintaining the area based overall reaction rate constant. Besides, from the comparison between Example 7 and Example 9, it can be understood that a catalyst made of wires on which a catalyst component was deposited is high in the effect of increasing area based overall reaction rate constant.

According to the present invention recited in appendix claim 1, a catalyst structure can be produced by using the same shape of platelike catalysts because platelike catalysts having protruded portions, or mountain portions and valley portions are stacked through netlike products having many holes passing through from the front to the back surface thereof, and thus platelike catalysts do not directly contact each other in the catalyst structure. Accordingly, manufacturing steps of the catalyst structure can be simplified, manufacturing cost can be reduced, and further, deformation of gas flow passages can be prevented and the strength of the catalyst structure can be increased. Besides, according to the invention, gas dispersing speed in the structure is increased since netlike products are positioned at about the center portion of gas flow passages; high catalyst performances are developed; and purification ratio of an exhaust gas, for example, denitration ratio is increased.

According to the invention recited in appendix claim 2, the surface area of platelike catalysts is enlarged to increase the efficiency of the contact with the objective component (NOx), and mechanical strength of platelike catalysts is increased in addition to the effects described above, because the platelike catalysts are prepared by first applying a denitrating catalyst component in the meshes of metal laths or glass fiber woven fabrics reinforced with an inorganic bonding agent and then forming the metal laths or reinforced fabrics into a proper shape.

According to the invention recited in appendix claim 3, mechanical strength of a catalyst structure is further increased in addition to the effects described above since the metal laths described above are used as netlike products.

According to the invention recited in appendix claim 4, strength of the platelike catalysts is increased and weight saving of the catalysts can be devised in addition to the effects described above since glass fiber woven fabrics reinforced by impregnating them with an inorganic bonding agent including silica or titania are used as netlike products.

According to the invention recited in appendix claim 5, catalyst reaction efficiency is further increased in addition to the effects described above since a catalyst component is deposited on the surface of netlike products.

According to the invention recited in appendix claim 6, denitration efficiency is further increased in addition to the effects described above since the catalyst component described above is used as denitration catalyst component.

According to the invention recited in appendix claim 7, a gas agitation effect is intensified to further increase catalyst reaction efficiency in addition to the effects described above, because the platelike catalysts are formed or assembled in a frame so that lengthwise direction of all or a part of protruded portions or mountain portions of the platelike catalysts have a prescribed angle relative to the flow direction of a gas to be treated.

According to the invention recited in appendix claim 8, a highly efficient and compact apparatus for purifying an exhaust gas can be produced by using a catalyst structure recited in any one of appendix claims 1 to 7.

According to any one of appendix claims 9 to 14, increase of pressure loss in a catalyst structure which is obtained by stacking gas dispersing members and catalyst plates of a narrow pitch can be repressed by freely changing the interval for disposing the linear, belt-shaped, or rodlike gas dispersing members, which are to be provided in a catalyst structure and described above. Besides, a gas flow disturbing effect can be maintained since deposition of a dust can be prevented even in a dirty gas by suitably adjusting the interval for disposing gas dispersing members. Further, flattening or crush of gas flow passages can be prevented and increase of pressure loss can be repressed by using gas dispersing members having a sufficiently high strength even when a high strength of a catalyst structure itself is required. Accordingly, a highly efficient and compact apparatus for purifying an exhaust gas can be provided.

INDUSTRIAL APPLICABILITY

Catalyst structure of the present invention is employed in an apparatus for purifying an exhaust gas such as an exhaust gas denitration apparatus, and is also used for purifying exhaust gases discharged from power plants, various plants, automobiles, and the likes.

What is claimed is:

1. A catalyst structure to be disposed in a frame fitting in an exhaust gas flow passage for purifying an exhaust gas, comprising
    platelike catalysts having many protruded portions, or mountain portions and valley portions, formed by bending flat platelike catalysts alternatively to the reverse direction at a prescribed interval, and
    gas dispersing members composed of metallic, ceramic, or glass netlike products having many holes passing from the front surface to the back surface thereof stacked alternately.

2. The catalyst structure for purifying an exhaust gas according to claim 1 wherein the platelike catalysts are products produced by applying a catalyst component containing titanium oxide as a main component and an oxide of vanadium, molybdenum, and/or tungsten added as active component, to meshes of metal laths or glass fiber woven fabrics reinforced with an inorganic bonding agent so that the catalyst component is embedded in the meshes.

3. The catalyst structure for purifying an exhaust gas according to claim 2 wherein the netlike products are metal laths.

4. The catalyst structure for purifying an exhaust gas according to claim 2 wherein the netlike products are glass fiber woven fabrics reinforced by impregnating the fabrics with an inorganic bonding agent.

5. The catalyst structure for purifying an exhaust gas according to claim 2 wherein a catalyst component is deposited on the surface of the netlike products.

6. The catalyst structure for purifying an exhaust gas according to claim 1 wherein the netlike products are metal laths.

7. The catalyst structure for purifying an exhaust gas according to claim 1 wherein the netlike products are glass fiber woven fabrics reinforced by impregnating the fabrics with an inorganic bonding agent.

8. The catalyst structure for purifying an exhaust gas according to claim 1 wherein a catalyst component is deposited on the surface of the netlike products.

9. The catalyst structure for purifying an exhaust gas according to claim 8 wherein the catalyst component is an oxide or oxides of one or more metals selected from the group consisting of titanium, vanadium, molybdenum, and tungsten.

10. The catalyst structure for purifying an exhaust gas according to claim 1 wherein the protruded portions or mountain portions of the catalyst elements (platelike catalysts) are formed with their lengthwise direction being inclined relative to one side of the platelike catalysts by a prescribed angle, and a plurality of the platelike catalysts are stacked with the netlike product being interposed therebetween and with the left and right sides of the platelike catalysts being interchanged alternately.

11. A catalyst structure to be disposed in a frame fitting in an exhaust gas flow passage for purifying the exhaust gas, comprising
    platelike catalysts having many pairs of protruded portions, or mountain portions and valley portions at a prescribed interval formed by bending flat platelike catalysts alternately to reverse direction; and,
    gas dispersing members prepared by arranging linear, belt-shaped, or rodlike materials of metal, ceramic, or glass in parallel at a prescribed interval stacked alternately.

12. The catalyst structure for purifying an exhaust gas according to claim 11 wherein the catalyst plates are products produced by applying a catalyst component containing titanium oxide as a main component and an oxide of vanadium, molybdenum, and/or tungsten added as active component, to meshes of metal laths or glass fiber woven fabrics reinforced with an inorganic bonding agent so that the catalyst component is embedded in the meshes.

13. The catalyst structure according to claim 11 wherein the gas dispersing members are structures prepared by connecting a part or all of the linear, belt-shaped, or rodlike materials.

14. The catalyst structure according to claim 11 wherein the gas dispersing member is disposed on a line connecting contact points of a protruded portion of one of adjacent catalyst plates with a flat plate portion of the other catalyst plate to be stacked.

15. The catalyst structure according to claim 11 wherein the gas dispersing members are products reinforced by impregnating the members with an inorganic bonding agent.

16. The catalyst structure according to claim 11 wherein a catalyst component is deposited on the surface of the gas dispersing members.

17. The catalyst structure according to claim 16 wherein the catalyst component to be deposited on the surface of the gas dispersing members is an oxide or oxides of one or more metals selected from the group consisting of titanium, vanadium, molybdenum, and tungsten.

18. The catalyst structure according to claim 11 wherein the protruded portions or mountain portions of the platelike catalysts are formed with their lengthwise direction being inclined relative to one side of the platelike catalysts by a prescribed angle, and a plurality of the platelike catalysts are stacked with the gas dispersing member being interposed therebetween and with their left and right sides of the platelike catalysts being interchanged alternately.

* * * * *